United States Patent
Schweiger

(10) Patent No.: US 11,511,682 B2
(45) Date of Patent: Nov. 29, 2022

(54) STRUCTURAL COMPONENT WITH A HINGE ELEMENT AND METHOD FOR PRODUCING A FLOOR ASSEMBLY OF A VEHICLE

(71) Applicant: AUDI AG, Ingolstadt (DE)

(72) Inventor: Stephan Schweiger, Altmannstein (DE)

(73) Assignee: AUDI AG, Ingolstadt (DE)

( * ) Notice: Subject to any disclaimer, the term of this patent is extended or adjusted under 35 U.S.C. 154(b) by 173 days.

(21) Appl. No.: 17/255,573

(22) PCT Filed: Aug. 6, 2019

(86) PCT No.: PCT/EP2019/071100
§ 371 (c)(1),
(2) Date: Dec. 23, 2020

(87) PCT Pub. No.: WO2020/030632
PCT Pub. Date: Feb. 13, 2020

(65) Prior Publication Data
US 2021/0284083 A1    Sep. 16, 2021

(30) Foreign Application Priority Data

Aug. 8, 2018    (DE) ...................... 10 2018 213 324.7

(51) Int. Cl.
*B60R 13/01*    (2006.01)
*B29C 53/06*    (2006.01)
*B29L 31/22*    (2006.01)

(52) U.S. Cl.
CPC .......... *B60R 13/013* (2013.01); *B29C 53/063* (2013.01); *B29L 2031/22* (2013.01)

(58) Field of Classification Search
CPC .. B60R 13/013; B29C 53/063; B29L 2031/22
(Continued)

(56) References Cited

U.S. PATENT DOCUMENTS 7,712,816 B2 *  5/2010  Ujimoto ................. B62D 25/20
                                                    180/326
8,596,317 B1 * 12/2013  McNulty .................. B60R 5/04
                                                    224/160
(Continued)

FOREIGN PATENT DOCUMENTS

DE    39 04 451 A1    8/1990
DE    43 43 970 A1    6/1995
(Continued)

OTHER PUBLICATIONS

Examination Report dated May 9, 2019 in corresponding German application No. 10 2018 213 324.7; 14 pages including Machine-generated English-language translation.
(Continued)

*Primary Examiner* — Pinel E Romain
(74) *Attorney, Agent, or Firm* — Maier & Maier, PLLC

(57) ABSTRACT

A structural component for a floor assembly of a vehicle. The structural component is formed integrally and includes at least one hinge element and a base part. The base part is configured to support the structural component on the vehicle when the structural component is installed in the vehicle. The at least one hinge element includes at least one flap element which is connected at least in regions to the base part and is configured to be pivoted relative to the base part and, in an end position, to at least partially enclose at least one predetermined construction space of the vehicle. The at least one flap element is furthermore configured in order, in the end position, to abut or to engage in a form-fitting manner against or on respective vehicle elements delimiting the at least one construction space of the vehicle.

20 Claims, 3 Drawing Sheets

(58) Field of Classification Search
USPC .......................................... 296/97.23, 37.16
See application file for complete search history.

(56) References Cited

U.S. PATENT DOCUMENTS

| | | | |
|---|---|---|---|
| 8,764,089 B2 * | 7/2014 | Preisler | .................. B32B 3/263 |
| | | | 296/97.23 |
| 10,173,610 B2 * | 1/2019 | Jin | ..................... B60R 13/0275 |
| 2011/0062742 A1 | 3/2011 | Alford | |
| 2014/0070560 A1 | 3/2014 | Young | |
| 2014/0205809 A1 | 7/2014 | Ishii et al. | |
| 2021/0347310 A1 * | 11/2021 | Aldrich | ..................... B60R 7/14 |

FOREIGN PATENT DOCUMENTS

| | | |
|---|---|---|
| DE | 10 2014 015 030 A1 | 4/2016 |
| DE | 10 2015 113 042 A1 | 2/2017 |
| EP | 2 202 134 A1 | 6/2010 |

OTHER PUBLICATIONS

International Search Report dated Sep. 18, 2019 in corresponding International application No. PCT/EP2019/071100; 6 pages.
Written Opinion of the International Searching Authority dated Sep. 18, 2019 in corresponding International application No. PCT/EP2019/071100; 12 pages including Machine-generated English-language translation.
English-language translation of International Preliminary Report on Patentability dated Feb. 18, 2021, in corresponding International Application No. PCT/EP2019/071100; 7 pages.

* cited by examiner

STRUCTURAL COMPONENT WITH A HINGE ELEMENT AND METHOD FOR PRODUCING A FLOOR ASSEMBLY OF A VEHICLE

BACKGROUND

In the production of vehicles prefabricated molded parts such as, for example, floor assemblies, are commonly arranged on a base frame. Due to the different configurations of a respective vehicle type, situations can occur here in which, due to a vehicle part to be provided additionally, a molded part does not fit in a respective vehicle or needs to be constructed especially for this vehicle. Such special constructions are complicated and expensive.

DE 10 2015 113042 A1 describes a sound absorption component for a vehicle with pressed-in hinge. Here, the hinge is used for the simple mounting of the sound absorption component on an acoustic vehicle component of the vehicle, which is to be insulated.

DE 39 04 451 A1 describes a cover mat for an interior of a vehicle.

DE 43 43 970 A1 describes a sound-insulating covering for a vehicle which can be adjusted flexibly to different vehicle surfaces.

SUMMARY

Against this backdrop, the aim of the presented invention is to provide a structural component for a floor assembly of a vehicle, which enables a variable arrangement of different vehicle parts in a predetermined construction space and in the process encloses the construction space with a minimum space requirement.

Thus, a structural component for a floor assembly of a vehicle is presented. The structural component is formed integrally and comprises at least one hinge element and a base part. The structural component is removable or to be removed, in particular as a complete component or else in combination with other elements such as, for example, a trim or a slider, in a single mold removal direction from a mold for producing the structural component. It is conceivable that additional parts are connected to the structural component, which are removed or are removable from the mold in alternative directions with respect to the mold removal direction.

The base portion is configured to support the structural component on the vehicle when the structural component is installed in the vehicle. The at least one hinge element comprises at least one flap element connected at least in regions to the base part, which is configured to be pivoted relative to the base part and, in the end position, to at least one predetermined construction space of the vehicle. The at least one flap element is furthermore configured in order, in the end position, to abut or to engage in a form-fitting manner against or on respective vehicle elements delimiting the at least one construction space of the vehicle.

The presented invention is used in particular for providing a structural component such as, for example, a floor assembly or a carpet support of a vehicle, which can be used independently of a respective configuration of a respective vehicle for all vehicles of a vehicle type or of a production line. For this purpose, the structural component according to the invention comprises a base part such as, for example, a base plate, which supports the structural component on the vehicle.

The structural component according to the invention is characterized in particular in that the structural component is removable or to be removed, in particular completely or in combination with other components such as, for example, a slider arranged on the structural component, in a single mold removal direction from a production mold for producing the structural component. This means that the structural component, in its production configuration, comprises no undercuts which bring about a mold removal of a structural component in multiple mold removal directions.

The structural component according to the invention can switch between at least two configurations. A production configuration in which the structural component comprises no undercuts, i.e., it extends substantially in a production plane, and an end configuration in which the structural component provides an enclosure which extends in particular in a direction, i.e., for example, perpendicular to the production plane of the structural component. Correspondingly, it is provided that the flap element provided according to the invention, in order to transfer the structural component from the production configuration into the end configuration out of the production plane in which the flap element is located in the production configuration, is folded into another plane which is in particular perpendicular to the production plane.

The base part can comprise, for example, a support element or a contact surface which engages on a predetermined position in a vehicle and, as a result, diverts stresses acting on the structural component into the vehicle. Correspondingly, the base part can, for example, comprise a support or act as support.

Furthermore, the structural component according to the invention comprises at least one hinge element. The hinge element comprises at least one movable flap element or can be designed as at least one movable flap element.

The hinge element can be formed, for example, by a pressing process, wherein the structural component is formed together with a hinge axis, in that the structural component, in the region of the hinge element, in particular in the region of the hinge axis, is exposed to particularly high pressure, so that, for example, a particularly highly compressed hinge axis is formed, about which the at least one flap element to be formed furthermore is to be pivoted.

In a possible embodiment, the at least one flap element is in regions cut or punched out of the base part but remains connected in regions to the base part, for example, via a hinge axis, so that the at least one flap element is to be pivoted along a predetermined trajectory.

Alternatively, the hinge element can comprise, for example, an axis in which a recess of the at least one flap element engages, so that on the axis a pivotable or movable transition between flap element and base part results.

Alternatively, the at least one flap element can be designed as marginal piece and be completely pivoted relative to the base part.

The flap element is configured to at least partially enclose a predetermined construction space of a respective vehicle. For this purpose, the flap element can be pivoted from a production position which the flap element is in after a production process, into an end position in which the flap element encloses a predetermined construction space.

In the end position, the flap element abuts and/or engages in a form-fitting manner against or on respective vehicle elements delimiting the at least one construction space of the vehicle. This means that the predetermined construction space is enclosed, preferably completely enclosed, in a form-fitting manner by the flap element. Accordingly, respective dimensions of the flap element are preferably selected as a function of the construction space to be enclosed.

As a result of the pivotable design of the flap element provided according to the invention, the structural component according to the invention can be introduced particularly easily in tight construction spaces. In a respective installation position of the structural component, the flap element can be pivoted into its end position.

The flap element provided according to the invention is furthermore designed in order in an end position, to abut and/or engage in a form-fitting manner against or on respective vehicle elements delimiting the at least one construction space of the vehicle. By a form-fitting connection of the flap element to respective elements delimiting a construction space of the vehicle, such as, for example, vehicle body supports, a particularly space-saving design of a recess formed by a flap element in its end position or of an enclosing structure for a construction space is enabled. Correspondingly, a respective construction space is particularly efficiently filled with a respective vehicle part or a filling material so that only small cavities and preferably no cavities form in the construction space.

Furthermore, by a form-fitting connection of the flap element to respective elements delimiting a construction space of the vehicle, a particularly dimensionally stable arrangement of the flap element or a maximum support of the flap element on a body shell of the vehicle is enabled.

In a possible embodiment of the presented structural component, it is provided that the least one flap element of the at least one hinge element is to be pivoted along a horizontal axis relative to the base part, in particular via an installation position into the end position.

By a pivoting movement of the flap element along a horizontal axis of the hinge element or a hinge axis installed horizontally in the structural component, i.e., an axis which, in an installation position of the structural component, extends horizontally, in particular horizontally with respect to a vehicle floor, the flap element can be installed in a particularly space-saving manner, in particular in an installation position, in which the flap element is oriented inclined by, for example, more than 90° relative to the base part, together with the base part into a respective installation site, and pivoted there into its end position which corresponds, for example, to a position of 90° relative to the base component. Accordingly, a flap element to be pivoted horizontally enables an arrangement of the structural component, in particularly tight construction spaces.

By folding the flap element from a production position into its installation position, the structural component according to the invention can be made smaller particularly in horizontal direction, so that the structural component can be introduced into particularly tight construction spaces.

In a possible embodiment of the presented structural component, it is provided that the at least one hinge element comprises a plurality of flap elements which is oriented along a hinge axis. It is provided that the flap elements are arranged spaced or abutting with respect to one another.

By means of multiple flap elements, a plurality of construction spaces can be enclosed or a plurality of recesses for respective vehicle parts can be provided. Here, respective flap elements can enclose respective construction spaces and/or multiple flap elements together can enclose a construction space and correspondingly form a complex construction space geometry.

In another possible embodiment of the presented structural component, it is provided that the at least one flap element comprises at least one rigid contact surface and at least one movable flap surface.

By a rigid contact surface, that is to say a surface which can be applied on, for example, a vehicle body component, a flap element can act as support and divert respective forces acting on the flap element into, for example, an element on which the contact surface rests. Correspondingly, a flap element which comprises a rigid, that is to say non-deformable, contact surface and at least one movable flap surface can provide a particularly stress-withstanding or dimensionally stable recess for the respective vehicle parts.

In another possible embodiment of the presented structural component, it is provided that the at least one hinge element is configured to provide a cover by means of which all the vehicle parts to be potentially arranged on, in particular all the vehicle parts to be potentially arranged in the at least one construction space, are to be covered or coverable.

In another possible embodiment of the presented structural component, it is provided that the structural component comprises a plurality of hinge elements each comprising a hinge axis, along which at least one flap element is to be pivoted, and the respective hinge axes of the respective hinge elements are oriented along a circumferential line of the at least one construction space.

By means of multiple hinge elements, a complex construction space geometry can be enclosed by flap elements in such a manner that the flap elements together provide a shell for the construction space, when the respective flap elements are pivoted in their end position. Here, for example, bent construction space structures can be enclosed.

The structural component according to the invention can be designed, for example, as nonwoven, in particular as fiber composite nonwoven. Furthermore, the structural component can be made of plastic, in particular fiber-reinforced plastic.

The at least one flap element provided according to the invention enables a removal of the structural component according to the invention from a corresponding mold for producing the structural component, without cost-intensive sliders having to be used for this purpose.

By means of the at least one flap element provided according to the invention, an undercut which prevents or makes difficult a removal of the structural component according to the invention from a corresponding mold for producing the structural component is avoided. By means of the flap element to be changed in terms of its orientation, the structural component can be pressed or cast in a production position which avoids an undercut. Subsequently, the flap element can be moved into an installation position and finally into an end position, which would bring about an undercut during production if the flap element were produced in the installation position or in the end position and not, as provided according to the invention, in the production position.

The presented invention furthermore relates to a production method for a floor assembly of a vehicle, in which an integral structural component with a base part and at least one hinge element is arranged in the vehicle. In the presented production method, the structural component is arranged in the vehicle in such a manner that the base part supports the structural component on the vehicle. Moreover, at least one flap element of the at least one hinge element, which is connected at least in regions to the base part, is pivoted relative to the base part, so that at least one construction space of the vehicle is at least partially enclosed by the at least one flap element in such a manner that the at least one flap element abuts or engages in a form-fitting manner against or on respective vehicle elements delimiting the at least one construction space of the vehicle.

The presented structural component is used in particular for carrying out the presented production method.

In a possible embodiment of the presented method, it is provided that the structural component is produced by pressing in a mold. Furthermore, it is provided that, during a pressing procedure for producing the structural component, the base part together with the at least one flap element of the at least one hinge element is provided substantially in one plane, and the structural component is taken out or removed from the mold in a single mold removal direction. Furthermore, it is provided that, for introducing the structural component into the vehicle, the at least one flap element is brought into an installation position, and, in an installation site of the structural component, the at least one flap element is brought from its installation position into an end position which is in particular perpendicular with respect to the base part.

In another possible embodiment of the presented method, it is provided that the construction space of the vehicle comprises a vehicle part.

By the pivoting of the flap element provided according to the invention, the structural component according to the invention can be moved along in a particularly thin or small configuration at sites which are particularly narrow or small and subsequently be broadened or increased in terms of surface area by a pivoting movement of the flap elements. Correspondingly, the structural component can be inserted into spaces which are not accessible to traditional structural components designed with fixed dimensions. Thus, by the structural component according to the invention, a filling of a construction space can be enabled, before the structural component is pivoted in its designated position, i.e., its end position, or when the structural element is in its designated position but the flap element is not yet pivoted into its end position.

By a pivoting movement of the flap element into its end position, the flap element can always enclose a corresponding construction space or a material projection arranged therein or a vehicle part arranged in the construction space, even without a base part of the structural component having to be adjusted to the dimensions of the construction space. In other words, the base part of the presented structural component can be implemented independently of the construction space.

Furthermore, the presented invention relates to a production method for a structural component, wherein the structural component is generated in a mold and is removed from a mold in a single mold removal direction, and wherein, during a generation process for producing the structural component, at least one flap element of at least one hinge element of the structural component, together with a base part of the structural component, is provided in a first, in particular horizontal, production position, and wherein, before the removal of the structural component from the mold, the at least one flap element is folded into a particular perpendicular removal position, so that an undercut of the structural component by the at least one flap element is avoided.

BRIEF DESCRIPTION OF THE FIGURES

The invention is diagrammatically represented based on an embodiment in the drawings and is described diagrammatically and in detail in reference to the drawings.

DETAILED DESCRIPTION

Figure 1:
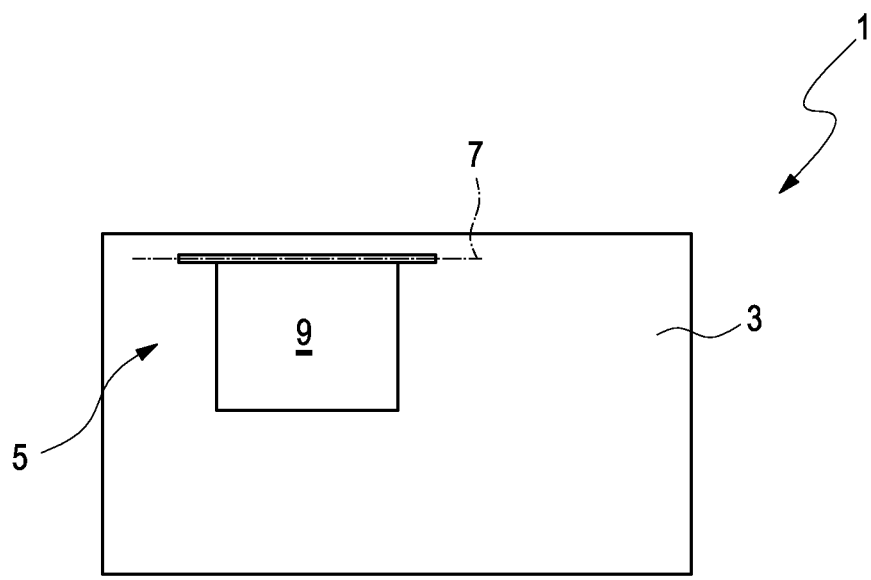
FIG. 1 shows a diagrammatic representation of a possible embodiment of the structural component according to the invention.

In FIG. 1, a structural component 1 is represented. The structural component 1 comprises a base part 3 and a hinge element 5.

The hinge element 5 comprises a hinge axis 7 and a movable flap element 9.

For arranging the structural component 1, such as, for example, a floor cushioning for a floor cover, in a vehicle, the flap element 9 in an installation position, together with a base part 3, is brought to a predetermined installation site.

In the installation position, which is here identical to a production position, the flap element 9 is completely integrated in the base part 3. This means that the flap element 9 is located within the base part 3, preferably in a plane with the base part 3. Alternatively, the flap element 9 can be designed as protuberance and protrude over the base part 3.

As soon as the structural component 1 is in its predetermined installation position, the flap element 9 is pivoted about the hinge axis 7 into its end position. In the end position, the flap element 9 is in regions outside of the base part 3, in particular the flap element 9 is turned out by 90° with respect to the plane in which it was arranged beforehand in the base part.

Preferably, the flap element 9 in its end position is in a different plane from that of the base part 3, so that a part, such as, for example, an upper margin of the flap element 9, is higher or lower with respect to a plane of the base part.

In its end position, the flap element 9 encloses a predetermined construction space. For this purpose, the flap element 9 in particular abuts in a form-fitting manner against respective parts, such as parts of a vehicle body, for example, enclosing the predetermined construction space, or it engages in the respective parts, for example, via a clip connection.

Figure 2:
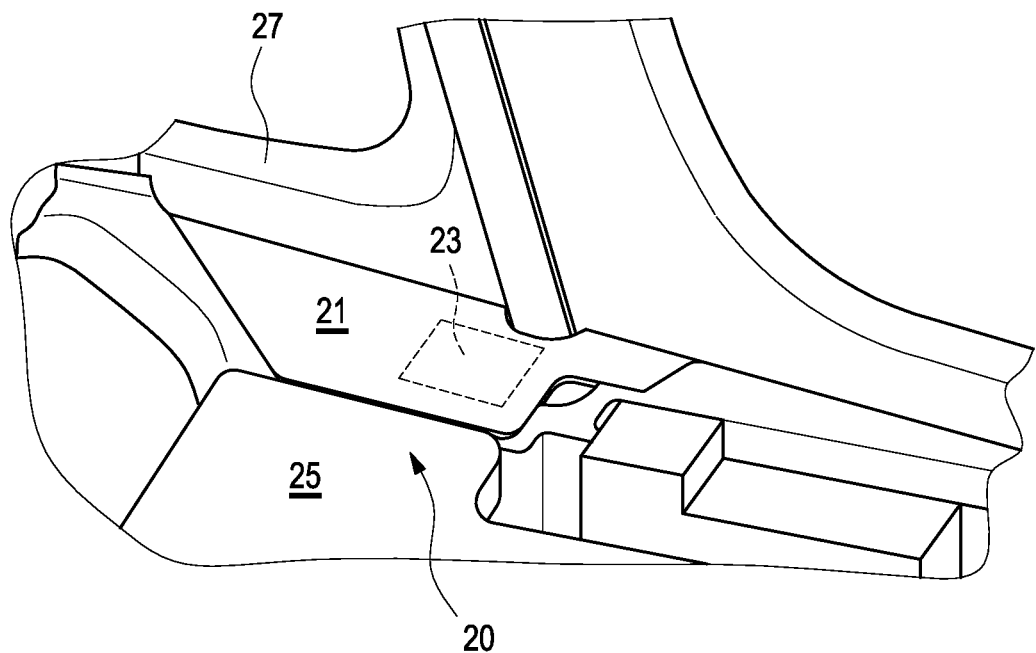
FIG. 2 shows a diagrammatic representation of a possible embodiment of the structural component according to the invention in a vehicle.

In the example shown in FIG. 2, a structural component 20 with a flap element 21 in its installation position is brought into a predetermined installation position along a construction space 23 in which a belt catch tensioner is arranged. As soon as the structural component 20 is in its predetermined installation position, the flap element 21 is pivoted from its installation position about a pivot or hinge axis into its end position, as represented in FIG. 2, so that the flap element 21 encloses the construction space 23 and, as a result, the belt catch tensioner.

The flap element 21, in its end position, abuts in a form-fitting manner against a vehicle body component 27. This form-fitting connection is provided according to the invention by the movable design of the flap element 21.

In an embodiment without movable flap element, a corresponding structural component could not be brought, together with a protuberance in the form of the flap element 21, into its predetermined position, since the structural component would have to be offset by at least the height of the protuberance and possibly would abut against other elements of a corresponding vehicle.

The structural component 20 is constructed in such a manner that, independently of a vehicle design with belt catch tensioner or without belt catch tensioner, the corresponding construction space is enclosed. As a result of the flap element abutting in a form-fitting manner against the remaining vehicle body parts, the resulting cavity which forms in the absence of a belt catch tensioner is sufficiently small that it does not lead to instabilities in the overall construction.

Figure 3:
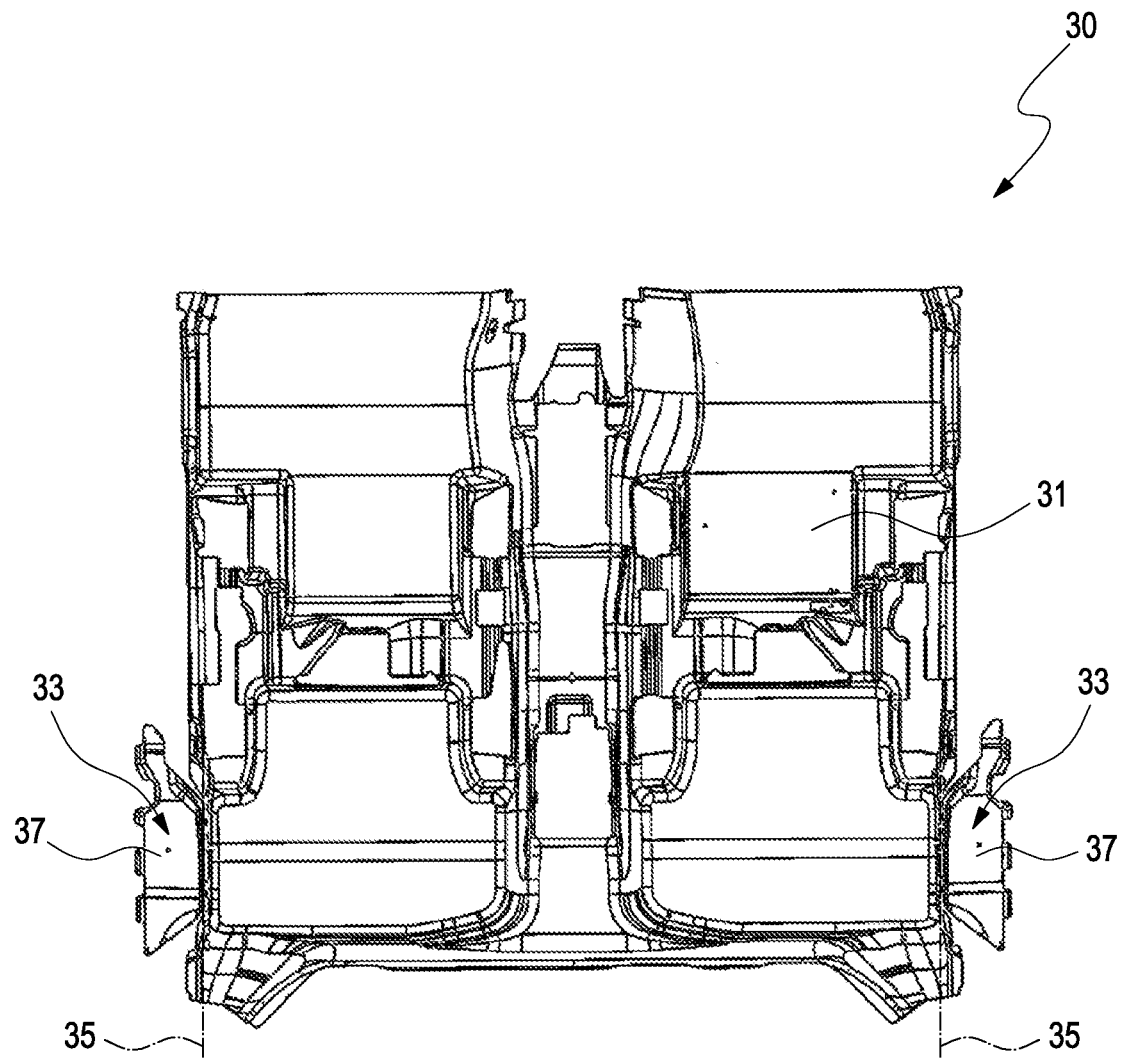
FIG. 3 shows a diagrammatic representation of an additional possible embodiment of the structural component according to the invention.

In FIG. 3, a structural component 30 is represented. The structural component 30 comprises a base part 31 and paired hinge elements 33 which respectively include a hinge axis 35 and a movable flap element 37.

For producing the structural component 30, the hinge elements 33 together with the base part 31 are formed horizontally, i.e., oriented in a common plane, so that an undercut of the hinge elements 33 with respect to the base part 31 is avoided, and the structural component 30 can easily be removed, i.e., in one removal direction, from a corresponding mold.

For arranging the structural component 30, the flap elements 37 are brought from their first production position provided during the production procedure into an installation position. In the installation position, the flap elements 37 stand, for example, perpendicular on the base part. Proceeding from the installation position, the flap elements 37 are brought into their end position, in which the flap elements enclose a predetermined construction space in a form-fitting manner.

It is conceivable that the flap elements 37 in the installation position are oriented inclined by more than 90° with respect to the base part 31, so that the flap elements 37 in an installation position of the structural component 30 can be folded into their designated perpendicular end position. This means that, when the structural component 30 is introduced into a respective vehicle, the flap elements 37 are brought from a horizontal position, i.e., for example, a 0° position, into a position greater than 90°, such as, for example, 100° and subsequently into their end position of 90°.

Figure 4:
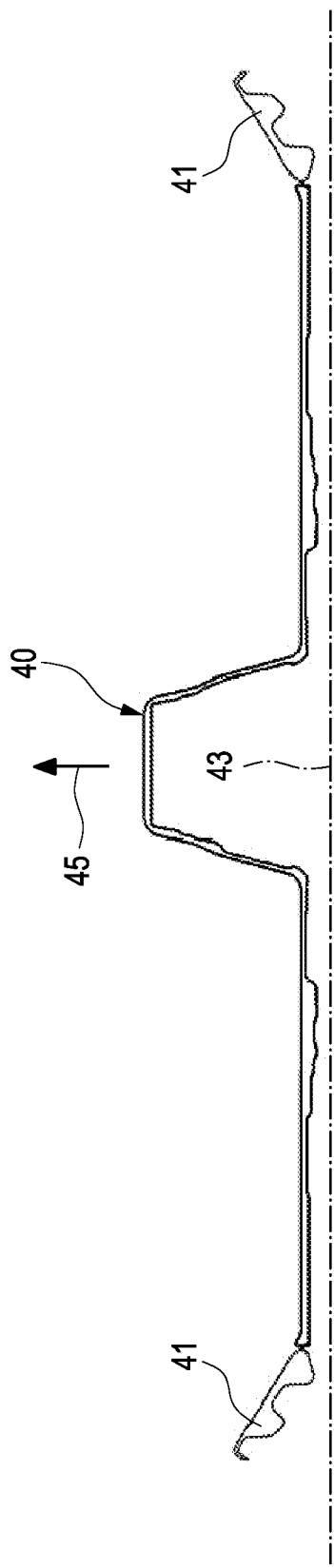
FIG. 4a shows a diagrammatic representation of an additional possible embodiment of the structural component according to the invention in a production configuration.
FIG. 4b shows a diagrammatic representation of the structural component from FIG. 4a in an end configuration.
Figure 4:
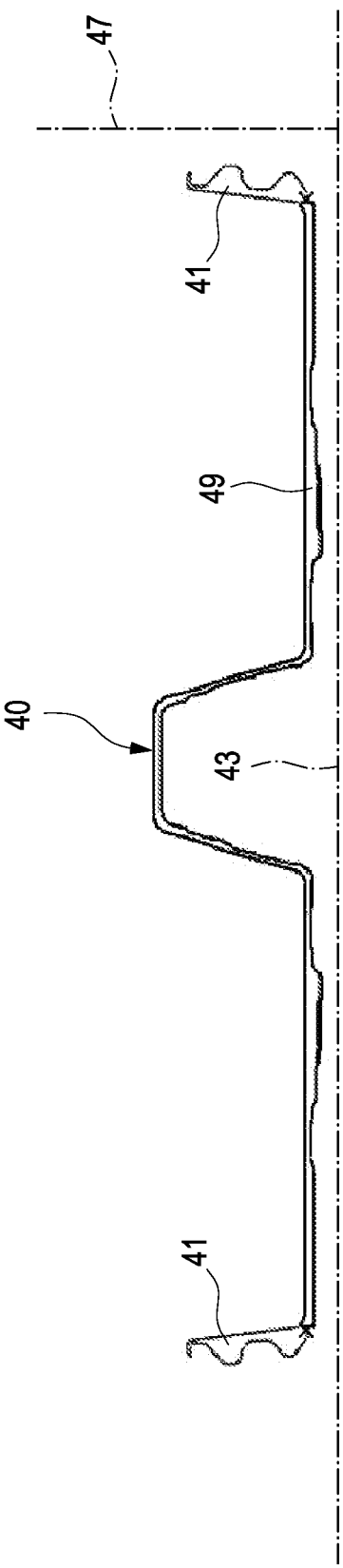

In FIG. 4a, a structural component 40 with flap elements 41 is represented. For producing the structural component 40, the structural component 40 in a production configuration is pressed in a mold. In the production configuration, the flap elements 41 lie substantially in a plane with a production plane 43. For example, the flap elements 41 are oriented substantially horizontally or slightly angled.

By the flap elements 41 oriented substantially horizontally with respect to the production plane, an undercut brought about by the flap elements 41 can be avoided. Correspondingly, the structural component in its production configuration can be easily removed from the mold in a single work step in the mold removal direction as indicated by arrow 45.

In FIG. 4b, the flap elements 41 of the structural component are represented folded into their end position. Correspondingly, the structural component 40 here is substantially in its end configuration, in which the flap elements 41 are oriented in an end position plane 47 which is, for example, substantially perpendicular to the production plane 43. Correspondingly, in the end configuration, by the flap elements 41, an enclosing structure for enclosing a construction space is provided, which, by using a traditional rigidly formed structural component, would bring about an undercut.

By avoiding the undercut by means of the flap element 41 provided according to the invention, a region provided for enclosing the construction space can be formed independently of the requirements of a mold removal geometry, so that the flap elements 41 and corresponding structures of a base part 49 of the structural component 40 can enclose the construction space, in particular in a form-fitting manner.

LIST OF REFERENCE NUMERALS

1 Structural component
3 Base part
5 Hinge element
7 Hinge axis
9 Flap element
20 Structural element
21 Flap element
23 Construction space
25 Base part
27 Vehicle body component
30 Structural component
31 Base part
33 Hinge element
35 Hinge axis
37 Flap element
40 Structural component
41 Flap element
43 Production plane
45 Arrow
47 End position plane

The invention claimed is:
1. A structural component for a vehicle, comprising:
at least one hinge element,
a base part,
wherein the structural component is removed or is removable or is to be removed in a single mold removal direction from a production mold for producing the structural component,
wherein the base part is configured to support the structural component on the vehicle when the structural component is installed in the vehicle,
wherein the at least one hinge element comprises at least one flap element which is connected at least in regions to the base part and is configured to be pivoted relative to the base part from a production position to an end position, to at least partially enclose at least one predetermined construction space of the vehicle, and
wherein the at least one flap element is configured to be maintained in the production position until moved into and maintained in the end position to abut or to engage in a form-fitting manner against or on respective vehicle elements delimiting the at least one construction space of the vehicle.

2. The structural component according to claim 1, wherein the at least one flap element of the at least one hinge element is to be pivoted about a hinge axis relative to the base part into the end position.

3. The structural component according to claim 1, wherein the at least one hinge element comprises a plurality of flap elements which is arranged along at least one hinge axis, and
wherein the flap elements are arranged spaced or abutting with respect to one another.

4. The structural component according to claim 2, wherein the at least one hinge axis is produced as part of the hinge element by a pressing process.

5. The structural component according to claim 1, wherein the at least one flap element comprises at least one rigid contact surface and at least one movable flap surface.

6. The structural component according to claim 1, wherein the at least one hinge element is configured to provide, in the end position, a cover by means of which all the vehicle parts to be potentially arranged on the at least one construction space are to be covered or are coverable.

7. The structural component according to claim 1, wherein the structural component comprises a plurality of hinge elements, each comprising a hinge axis, along which at least one flap element is to be pivoted, and wherein the respective hinge axes of the respective hinge elements are arranged along a circumferential line of the at least one construction space.

8. A production method for a floor assembly of a vehicle, wherein an integral structural component with a base part and at least one hinge element is arranged in the vehicle, wherein the structural component is arranged in the vehicle in such a manner that the base part of the structural component is supported on the vehicle, and wherein at least one flap element of the at least one hinge element, which is connected at least in regions to the base part, is pivoted relative to the base part from a production position to an end position, so that at least one construction space of the vehicle is enclosed at least partially by the at least one flap element, in such a manner that the at least one flap element is maintained in the production position until moved into and maintained in the end position and abuts or engages in a form-fitting manner against or on respective vehicle elements delimiting the at least one construction space of the vehicle.

9. The production method according to claim 8, wherein the structural component is produced by pressing in a mold,
wherein, during the production of the structural component, the at least one flap element of the at least one hinge element, together with a base part, is provided in a common plane,
wherein the structural component is taken out or removed from the mold in a single mold removal direction,
wherein, in order to introduce the structural component into the vehicle, the at least one flap element is brought into an installation position,
and
wherein, at an installation site of the structural component, the at least one flap element is brought from its installation position into the end position which is in particular perpendicular relative to the base part.

10. The production method according to claim 8, wherein the construction space of the vehicle comprises a vehicle part and/or is filled with a filling material.

11. The production method for a structural component according claim 1, wherein the structural component is generated in a mold and taken out of the mold in a single mold removal direction, wherein, during a generation process for producing the structural component, at least one flap element of at least one hinge element of the structural component, together with a base part of the structural component, is provided in one plane, and wherein, before taking the structural component out of the mold, the at least one flap element is folded into a removal position which is in particular perpendicular relative to the base part, so that an undercut of the structural component by the at least one flap element is avoided.

12. The structural component according to claim 2, wherein the at least one hinge element comprises a plurality of flap elements which is arranged along at least one hinge axis, and
wherein the flap elements are arranged spaced or abutting with respect to one another.

13. The structural component according to claim 3, wherein the at least one hinge axis is produced as part of the hinge element by a pressing process.

14. The structural component according to claim 2, wherein the at least one flap element comprises at least one rigid contact surface and at least one movable flap surface.

15. The structural component according to claim 3, wherein the at least one flap element comprises at least one rigid contact surface and at least one movable flap surface.

16. The structural component according to claim 4, wherein the at least one flap element comprises at least one rigid contact surface and at least one movable flap surface.

17. The structural component according to claim 2, wherein the at least one hinge element is configured to provide, in the end position, a cover by means of which all the vehicle parts to be potentially arranged on the at least one construction space are to be covered or are coverable.

18. The structural component according to claim 3, wherein the at least one hinge element is configured to provide, in the end position, a cover by means of which all the vehicle parts to be potentially arranged on the at least one construction space are to be covered or are coverable.

19. The structural component according to claim 4, wherein the at least one hinge element is configured to provide, in the end position, a cover by means of which all the vehicle parts to be potentially arranged on the at least one construction space are to be covered or are coverable.

20. The structural component according to claim 5, wherein the at least one hinge element is configured to provide, in the end position, a cover by means of which all the vehicle parts to be potentially arranged on the at least one construction space are to be covered or are coverable.

* * * * *